United States Patent
Kanda et al.

(10) Patent No.: US 11,005,380 B2
(45) Date of Patent: May 11, 2021

(54) POWER SUPPLY DEVICE

(71) Applicant: Yazaki Corporation, Tokyo (JP)

(72) Inventors: Keisuke Kanda, Shizuoka (JP); Shota Yoshimitsu, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/889,719

(22) Filed: Jun. 1, 2020

(65) Prior Publication Data

US 2020/0389094 A1    Dec. 10, 2020

(30) Foreign Application Priority Data

Jun. 4, 2019    (JP) .............................. JP2019-104241

(51) Int. Cl.
| | |
|---|---|
| *G05F 1/577* | (2006.01) |
| *H02M 3/158* | (2006.01) |
| *H02M 3/335* | (2006.01) |
| *H02M 1/088* | (2006.01) |
| *H02M 1/00* | (2006.01) |

(52) U.S. Cl.
CPC ....... *H02M 3/33576* (2013.01); *H02M 1/088* (2013.01); *G05F 1/577* (2013.01); *H02M 3/1584* (2013.01); *H02M 2001/008* (2013.01); *H02M 2001/009* (2013.01)

(58) Field of Classification Search
CPC ............ G05F 1/577; H02M 2001/008; H02M 2001/009; H02M 3/1584
USPC .................................................. 323/271, 272
See application file for complete search history.

(56) References Cited

U.S. PATENT DOCUMENTS

| | | | | |
|---|---|---|---|---|
| 6,075,295 | A   * | 6/2000  | Li ......................... | H02M 3/158 307/39 |
| 2004/0070376 | A1* | 4/2004  | Hoshino ................ | H02M 3/158 323/267 |
| 2010/0283322 | A1* | 11/2010 | Wibben ............. | H05B 45/3725 307/31 |
| 2013/0234513 | A1* | 9/2013  | Bayer ...................... | H02J 1/08 307/31 |
| 2015/0001933 | A1* | 1/2015  | Uan-Zo-Li ............. | H02M 1/36 307/31 |
| 2017/0025955 | A1* | 1/2017  | Hang .................. | H02M 3/1582 |

(Continued)

FOREIGN PATENT DOCUMENTS

| | | |
|---|---|---|
| JP | 2004-135442 A | 4/2004 |
| KR | 2008-0073173 A | 8/2008 |
| WO | 2004/013950 A2 | 2/2004 |

*Primary Examiner* — Gary A Nash
(74) *Attorney, Agent, or Firm* — Kenealy Vaidya LLP

(57) ABSTRACT

A multi-output power supply device includes an inductor, a first output terminal, a second output terminal, an FET, an FET, a chopper circuit, and a controller. The FET adjusts a current output from the inductor to the first output terminal. The FET adjusts a current output from the inductor to the second output terminal. The chopper circuit has the FET and the inductor. The FET is connected in parallel with the FET, and conducts or cuts off a current. The inductor is provided between the FET and the second output terminal. For example, the controller lowers a potential from the first output terminal by turning on the FET and sets a potential difference between a drain terminal and a source terminal of the FET to zero to suppress a switching loss when the FET is turned on.

4 Claims, 16 Drawing Sheets

(56) References Cited

U.S. PATENT DOCUMENTS

2017/0194857 A1* 7/2017 Hang ................... H02M 3/158
2017/0237346 A1* 8/2017 Toyama ................ H02M 1/08
　　　　　　　　　　　　　　　　　　　　　　　323/271

* cited by examiner

POWER SUPPLY DEVICE

CROSS-REFERENCE TO RELATED APPLICATION(S)

The present application claims priority to and incorporates by reference the entire contents of Japanese Patent Application No. 2019-104241 filed in Japan on Jun. 4, 2019.

BACKGROUND OF THE INVENTION

1. Field of the Invention

The present invention relates to a power supply device.

2. Description of the Related Art

Conventionally, as a power supply device, for example, there is a single-inductor multi-output circuit that includes a single inductor and a plurality of switching elements, converts power output from the single inductor into power of a plurality of different voltages by the plurality of switching elements, and outputs the converted power. Note that Japanese Patent Application Laid-open No. 2004-135442 discloses a switching power supply device that includes a coil having an intermediate tap and supplies power of a plurality of voltages.

Meanwhile, in the above-described single-inductor multi-output circuit, for example, noise is generated due to a current flowing due to a reverse recovery characteristic of a parasitic diode of the switching element, and there is a possibility that this noise may cause a switching loss.

SUMMARY OF THE INVENTION

Then, this invention has been made in view of the above problem, and an object thereof is to provide the power supply device which can appropriately supply power of several different voltage.

In order to achieve the above mentioned object, a power supply device according to one aspect of the present invention includes a power conversion inductor that outputs power input from a first end to a second end; a first output terminal that is connected to the second end of the power conversion inductor and outputs power; a second output terminal that is a terminal different from the first output terminal, is connected to the second end of the power conversion inductor, and outputs power; a first switching element that is provided between the second end of the power conversion inductor and the first output terminal and adjusts a current output from the power conversion inductor to the first output terminal; a second switching element that is provided between the second end of the power conversion inductor and the second output terminal and adjusts a current output from the power conversion inductor to the second output terminal; a soft switching circuit including a third switching element that is connected in parallel with the second switching element and conducts or cuts off a current, and a soft switching inductor provided between the third switching element and the second output terminal; and a controller configured to control the first switching element, the second switching element, and the soft switching circuit, wherein the controller lowers a potential from the first output terminal by turning on the third switching element and sets a potential difference between an input terminal and an output terminal of the second switching element to zero to suppress a switching loss when the second switching element is turned on.

According to another aspect of the present invention, in the power supply device, it is preferable that the controller has a first power output mode of turning on the first switching element and turns off the second switching element and the third switching element to output first power from the first output terminal, and a second power output mode of turning on the second switching element and turning off the first switching element and the third switching element to output second power from the second output terminal, and the controller turns off the first switching element and the second switching element and turns on the third switching element to output a current flowing due to a reverse recovery characteristic of a parasitic diode of the first switching element to the second output terminal when switching from the first power output mode to the second power output mode.

According to still another aspect of the present invention, in the power supply device, it is preferable that the soft switching circuit forms a step-down chopper circuit that steps down a voltage of power output from the first output terminal and outputs the stepped down voltage to the second output terminal, and forms a step-up chopper circuit that steps up a voltage of power output from the second output terminal and outputs the stepped up voltage to the first output terminal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A mode (embodiment) for carrying out the present invention will be described in detail with reference to the drawings. The present invention is not limited by contents described in the following embodiment. In addition, constituent elements described below include constituent elements that can be easily assumed by those skilled in the art and constituent elements that are substantially the same. Further, configurations described below can be appropriately combined. In addition, various omissions, substitutions, or changes of the configurations can be made within a scope not departing from a gist of the present invention.

Embodiment

Figure 1:
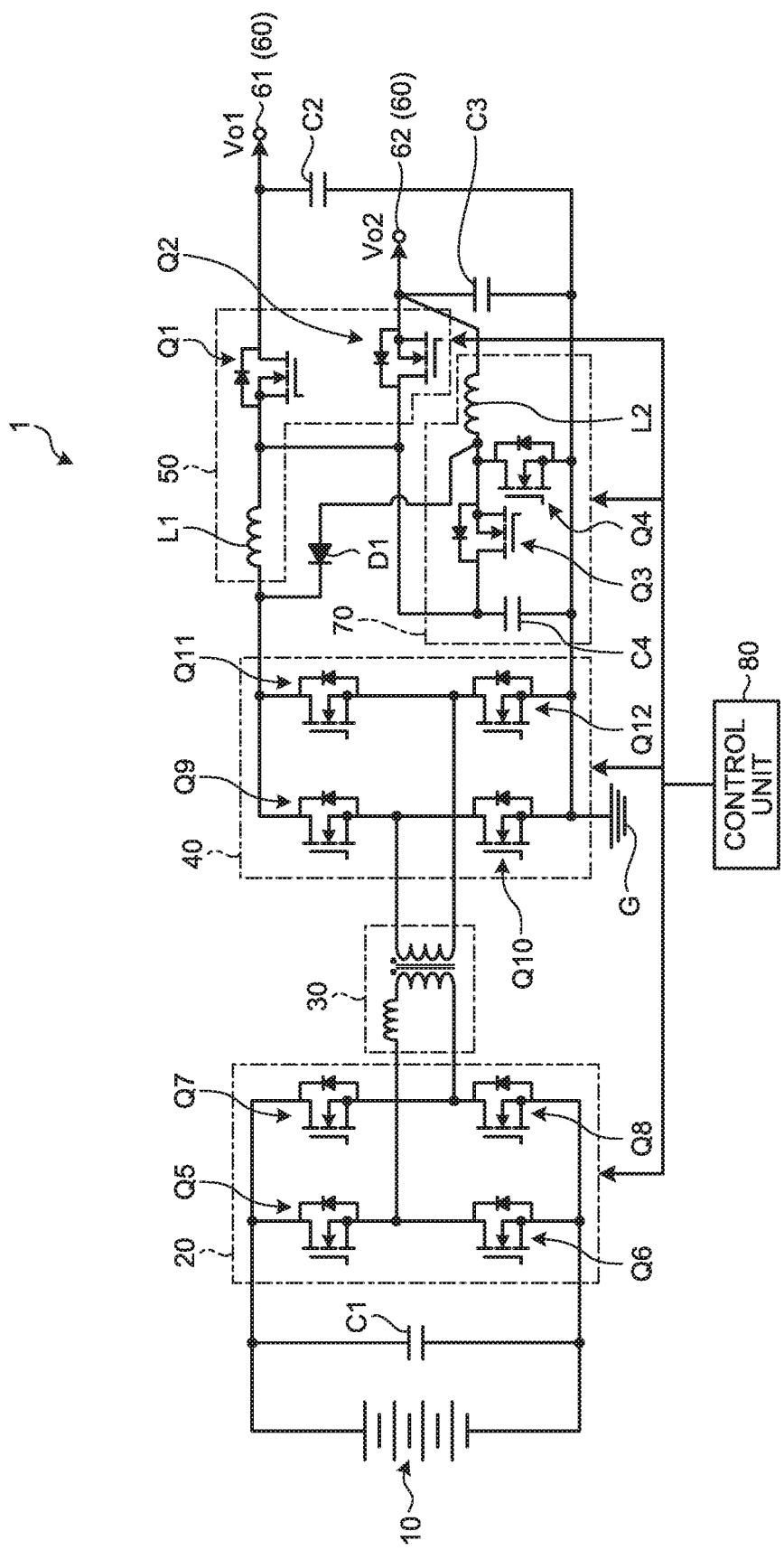
FIG. 1 is a circuit diagram illustrating a configuration example of a multi-output power supply device according to an embodiment.

A multi-output power supply device (power supply device) 1 according to an embodiment will be described with reference to the drawings. FIG. 1 is a circuit diagram illustrating a configuration example of a multi-output power supply device 1 according to the embodiment. The multi-output power supply device 1 forms a plurality of different power supplies from a high-voltage power supply 10. The multi-output power supply device 1 is mounted on a vehicle, for example, and supplies power to each electric component of the vehicle. As illustrated in FIG. 1, the multi-output power supply device 1 includes a power supply 10, full-bridge circuit 20, a transformer 30, a rectifier circuit 40, a single inductor multiple output (SIMO) circuit 50, an output unit 60, a chopper circuit 70 serving as a soft switching circuit, a diode D1, and a controller 80.

The power supply 10 supplies DC power. The power supply 10 is configured, for example, by connecting a plurality of battery cells in series. The power supply 10 supplies power of a relatively high voltage that requires insulation.

The full-bridge circuit 20 converts DC power into AC power. The full-bridge circuit 20 includes four switching elements. The full-bridge circuit 20 includes, for example, a field-effect transistor (FET) Q5, an FET Q6, an FET Q7, and an FET Q8. The FETs Q5 to Q8 are, for example, N-channel metal-oxide-semiconductor (MOS) FETs.

The full-bridge circuit 20 forms a first series circuit by connecting a source terminal of the FET Q5 and a drain terminal of the FET Q6. In the first series circuit, a drain terminal of the FET Q5 is connected to a positive electrode of the power supply 10, and a source terminal of the FET Q6 is connected to a negative electrode of the power supply 10.

The full-bridge circuit 20 forms a second series circuit by connecting a source terminal of the FET Q7 and a drain terminal of the FET Q8. In the second series circuit, a drain terminal of the FET Q7 is connected to a positive electrode of the power supply 10, and a source terminal of the FET Q8 is connected to a negative electrode of the power supply 10. In addition, the second series circuit is connected in parallel with the first series circuit by connecting the drain terminal of the FET Q7 to the drain terminal of the FET Q5 and connecting the source terminal of the FET Q8 to the source terminal of the FET Q6.

The full-bridge circuit 20 is connected to the controller 80, and the FETs Q5 to Q8 are controlled by the controller 80. The full-bridge circuit 20 converts DC power supplied from the power supply 10 into AC power using the FETs Q5 to Q8, and outputs the AC power to a primary winding of the transformer 30. Note that a smoothing capacitor C1 is provided between the full-bridge circuit 20 and the power supply 10.

The transformer 30 is configured to transform a voltage of AC power. The transformer 30 includes the primary winding and a secondary winding. The primary winding and the secondary winding are magnetically coupled while being insulated from each other. The primary winding is connected to the full-bridge circuit 20. The primary winding has, for example, one end connected to a connection line between the source terminal of the FET Q5 and the drain terminal of the FET Q6 and the other end connected to a connection line between the source terminal of the FET Q7 and the drain terminal of the FET Q8.

The secondary winding is connected to the rectifier circuit 40. The secondary winding has, for example, one end connected to a connection line between a source terminal of a FET Q9 and a drain terminal of a FET Q10, which will be described later, and the other end connected to a connection line between a source terminal of a FET Q11 and a drain terminal of a FET Q12. The degree of voltage transformation of the transformer 30 is determined depending on a turn ratio (transformation ratio) between the primary winding and the secondary winding. The transformer 30 has the same polarity, transforms the AC power supplied from the full-bridge circuit 20, and outputs the AC power to the rectifier circuit 40.

The rectifier circuit 40 rectifies AC power into DC power. The rectifier circuit 40 includes four switching elements. The rectifier circuit 40 includes, for example, the FET Q9, the FET Q10, the FET Q11, and the FET Q12. The rectifier circuit 40 forms a bridge circuit by the FETs Q9 to Q12 and performs full-wave rectification.

The rectifier circuit 40 forms a first series circuit by connecting the source terminal of the FET Q9 and the drain terminal of the FET Q10. In the first series circuit, a drain terminal of the FET Q9 is connected to the SIMO circuit 50, and a source terminal of the FET Q10 is connected to a ground G.

The rectifier circuit 40 forms a second series circuit by connecting the source terminal of the FET Q11 and the drain terminal of the FET Q12. In the second series circuit, a drain terminal of the FET Q11 is connected to the SIMO circuit 50, and a source terminal of the FET Q12 is connected to the ground G. In addition, the second series circuit is connected in parallel with the first series circuit by connecting the drain terminal of the FET Q11 to the drain terminal of the FET Q9 and connecting the source terminal of the FET Q12 to the source terminal of the FET Q10.

As described above, one end of the secondary winding of the rectifier circuit 40 is connected to the connection line between the source terminal of the FET Q9 and the drain terminal of the FET Q10. In the rectifier circuit 40, the other end of the secondary winding is connected to the connection line between the source terminal of the FET Q11 and the drain terminal of the FET Q12. The rectifier circuit 40 is connected to the controller 80, and the FETs Q9 to Q12 are controlled by the controller 80. The rectifier circuit 40 rectifies the AC power transformed by the transformer 30 into DC power and outputs the DC power to the SIMO circuit 50.

The SIMO circuit 50 is configured to share a single inductor L1 among a plurality of power supplies and obtain power of a plurality of different voltages. The SIMO circuit 50 includes the inductor L1, a FET Q1, and a FET Q2. The inductor L1 outputs DC power input from one end to the other end, and smoothes the DC power (pulsating flow). The inductor L1 is provided between the rectifier circuit 40 and the FETs Q1 and Q2. The inductor L1 has one end connected to the connection line between the drain terminal of the FET Q9 and the drain terminal of the FET Q1 and the other end connected to a source terminal of FET Q1 and a drain terminal of FET Q2. The inductor L1 smoothes the DC power rectified by the rectifier circuit 40, and outputs the smoothed DC power to the FET Q1 or the FET Q2.

The FET Q1 is, for example, an N-channel MOSFET. The FET Q1 is provided between the other end of the inductor L1 and a first output terminal 61. The FET Q1 has the source terminal connected to the other end of the inductor L1, and a drain terminal connected to the first output terminal 61. The FET Q1 has a gate terminal connected to the controller 80 and is controlled by the controller 80. The FET Q1 adjusts a current output from the inductor L1 to the first output terminal 61, and outputs power of a first voltage Vo1 to the first output terminal 61.

The FET Q2 is, for example, an N-channel MOSFET. The FET Q2 is provided between the other end of the inductor L1 and a second output terminal 62. The FET Q2 has the drain terminal connected to the other end of the inductor L1, and a source terminal connected to the second output terminal 62. The FET Q2 has a gate terminal connected to the controller 80 and is controlled by the controller 80. The FET Q2 adjusts a current output from the inductor L1 to the second output terminal 62, and outputs power of a second voltage Vo2, lower than the first voltage Vo1, to the second output terminal 62.

The output unit 60 outputs DC power. The output unit 60 is connected to the FETs Q1 and Q2, and outputs DC power output from the FETs Q1 and Q2. The output unit 60 includes the first output terminal 61 and the second output terminal 62. The first output terminal 61 and the second output terminal 62 are different terminals. The first output terminal 61 is connected to the other end of the inductor L1 via the FET Q1. The first output terminal 61 is connected to, for example, the drain terminal of the FET Q1, and outputs DC power of the first voltage Vo1 output from the FET Q1 to the outside. Note that a smoothing capacitor C2 is provided between the FET Q1 and the first output terminal 61.

The second output terminal 62 is connected to the other end of the inductor L1 via the FET Q2. The second output terminal 62 is connected to, for example, the source terminal of the FET Q2, and outputs DC power of the second voltage Vo2 output from the FET Q2 to the outside. Note that a smoothing capacitor C3 is provided between the FET Q2 and the second output terminal 62.

The chopper circuit 70 is a circuit having a function of suppressing noise generated by a reverse recovery current IR (see FIG. 4 and the like) flowing due to a reverse recovery characteristic of a parasitic diode of the FET Q1. The chopper circuit 70 is configured to include a FET Q3, a FET Q4, and an inductor L2. The chopper circuit 70 is connected to the controller 80, and the FETs Q3 and Q4 are controlled by the controller 80. The FET Q3 is, for example, an N-channel MOSFET. The FET Q3 is connected in parallel with the FET Q2 of the SIMO circuit 50. The FET Q3 has, for example, a drain terminal connected to the drain terminal of the FET Q2 and a source terminal connected to the source terminal of the FET Q2. The FET Q3 conducts the reverse recovery current IR flowing due to the reverse recovery characteristic of the parasitic diode of the FET Q1, and outputs the current to the second output terminal 62 via the inductor L2.

The FET Q4 is an N-channel MOSFET, and has a source terminal connected to the ground G and a drain terminal connected to a connection line connecting the source terminal of the FET Q3 and the inductor L2.

The inductor L2 is provided between the FET Q3 and the second output terminal 62. In the inductor L2, a DC superposition characteristic of the inductor L2 is set to be smaller than a DC superposition characteristic of the inductor L1. The inductor L2 has one end connected to the source terminal of the FET Q3, and the other end connected to the second output terminal 62. The inductor L2 smoothes DC power output from FET Q3, and outputs the smoothed DC power to the second output terminal 62.

The chopper circuit 70 has a power conversion function as well as the above-described function of suppressing the noise generated by the reverse recovery current IR. The chopper circuit 70 constitutes, for example, a step-down chopper circuit that steps down the first voltage Vo1 of the power output from the first output terminal 61 to the second voltage Vo2 and outputs the second voltage Vo2 to the second output terminal 62. In addition, the chopper circuit 70 constitutes a step-up chopper circuit that steps up the second voltage Vo2 of the power output from the second output terminal 62 to the first voltage Vo1 and outputs the first voltage Vo1 to the first output terminal 61.

The diode D1 has an anode terminal connected between the FET Q3 and the inductor L2 of the chopper circuit 70, and a cathode terminal connected between the rectifier circuit 40 and the SIMO circuit 50. Here, the DC superposition characteristic of the inductor L2 is set to be smaller than that of the inductor L1 as described above. For this reason, the diode D1 causes a current flowing from the inductor L1 to the inductor L2 to flow back to the inductor L1 by turning on the FET Q3 (a freewheel operation).

The controller 80 controls various circuits. The controller 80 includes an electronic circuit configured mainly by a well-known microcomputer including a CPU and a ROM, a RAM constituting a storage unit, and an interface. The controller 80 is connected to the full-bridge circuit 20 and controls the full-bridge circuit 20 to convert DC power supplied from the power supply 10 into AC power and output the AC power to the transformer 30. The controller 80 is connected to the rectifier circuit 40 and controls the rectifier circuit 40 to rectify AC power transformed by the transformer 30 into DC power and output the DC power to the SIMO circuit 50.

The controller 80 is connected to the SIMO circuit 50 and controls the SIMO circuit 50 to convert the DC power rectified by the rectifier circuit 40 into DC power of a plurality of different voltages. For example, the controller 80 converts the DC power rectified by the rectifier circuit 40 into power of the first voltage Vo1 and outputs the power from the first output terminal 61. In addition, the controller 80 converts the DC power rectified by the rectifier circuit 40 into power of the second voltage Vo2, lower than the first voltage Vo1, and outputs the power from the second output terminal 62.

The controller 80 is connected to the chopper circuit 70 and controls the chopper circuit 70 to output the reverse recovery current IR flowing due to the reverse recovery characteristic of the parasitic diode of the FET Q1 to the second output terminal 62 via the inductor L2. The controller 80 controls the chopper circuit 70 to step down the first voltage Vo1 of the power output from the first output terminal 61 to the second voltage Vo2 and output the second voltage Vo2 to the second output terminal 62. The controller 80 controls the chopper circuit 70 to step up the second voltage Vo2 of the power output from the second output terminal 62 to the first voltage Vo1 and output the first voltage Vo1 to the first output terminal 61.

Next, operation examples of the multi-output power supply device 1 will be described with reference to FIGS. 2 to 15. Note that circuit diagrams illustrated in FIGS. 2, 4, 6, 8, 10, 12, and 14 have the same configurations as the circuit diagram illustrated in FIG. 1, but the circuit configuration is partially changed, for example, the rectifier circuit 40 is described using a diode, in order to facilitate understanding of the description. Sequence diagrams illustrated in FIGS. 3, 5, 7, 9, 11, 13, and 15 illustrate a voltage Vtr_p of the transformer 30, on/off operations of the FETs Q1 to Q3, an inductor current IL flowing through the inductor L1, the inductor current IL1 output to the first output terminal 61, an inductor current IL2 output to the second output terminal 62, and the reverse recovery current IR output to the second output terminal 62.

Figure 2:
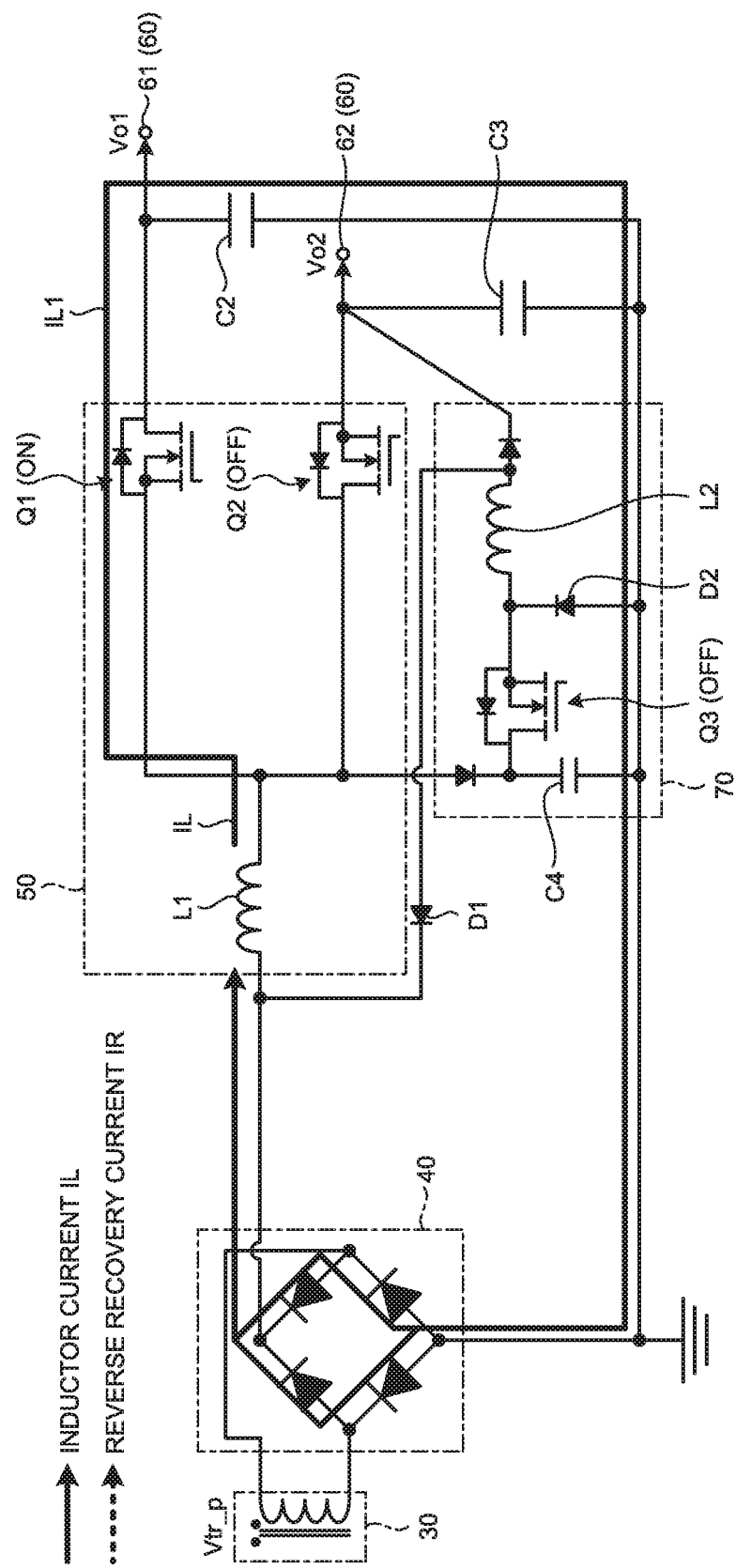
FIG. 2 is a circuit diagram illustrating a first operation example of the multi-output power supply device according to the embodiment.
Figure 3:
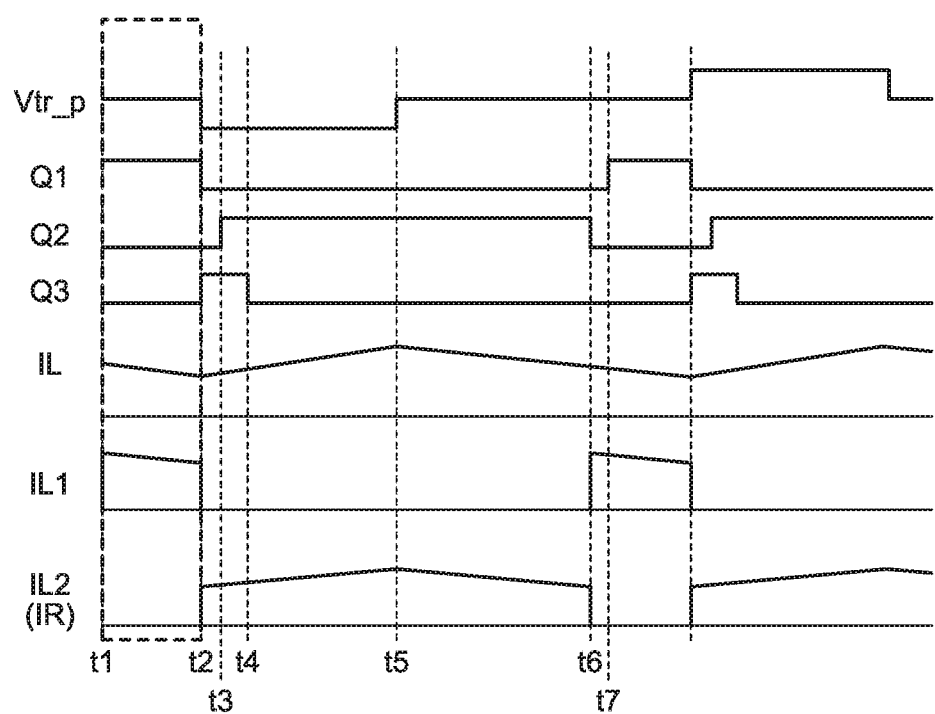
FIG. 3 is a sequence diagram illustrating the first operation example of the multi-output power supply device according to the embodiment.

FIG. 2 is a circuit diagram illustrating a first operation example of the multi-output power supply device 1 according to the embodiment. FIG. 3 is a sequence diagram illustrating the first operation example of the multi-output power supply device 1 according to the embodiment. As illustrated in FIGS. 2 and 3, the controller 80 turns on the FET Q1 and turns off the FETs Q2 and Q3 at time t1 to output the inductor current IL1 from the first output terminal 61 (a first power output mode). At this time, the controller 80 does not output the inductor current IL2 from the second output terminal 62.

Figure 4:
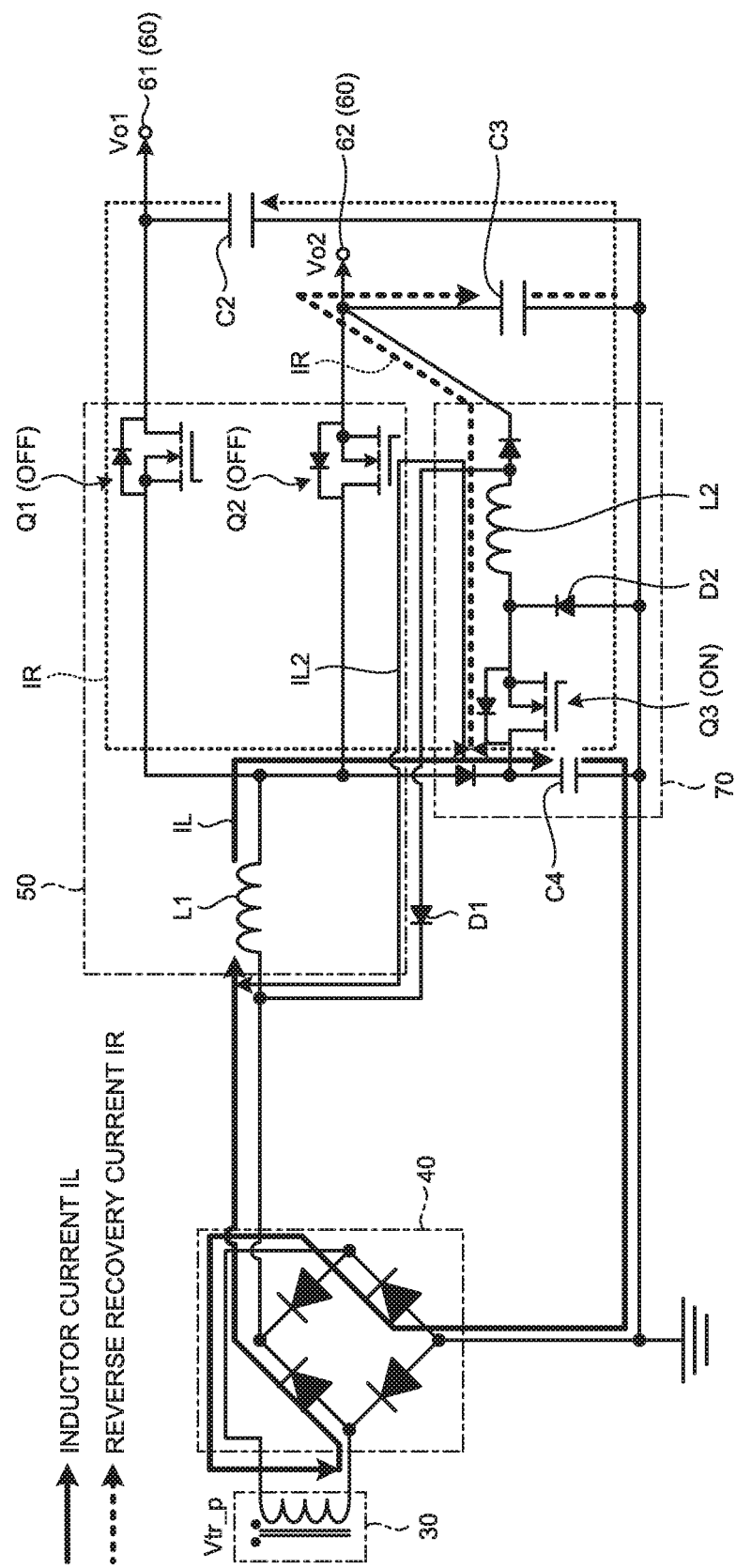
FIG. 4 is a circuit diagram illustrating a second operation example of the multi-output power supply device according to the embodiment.
Figure 5:
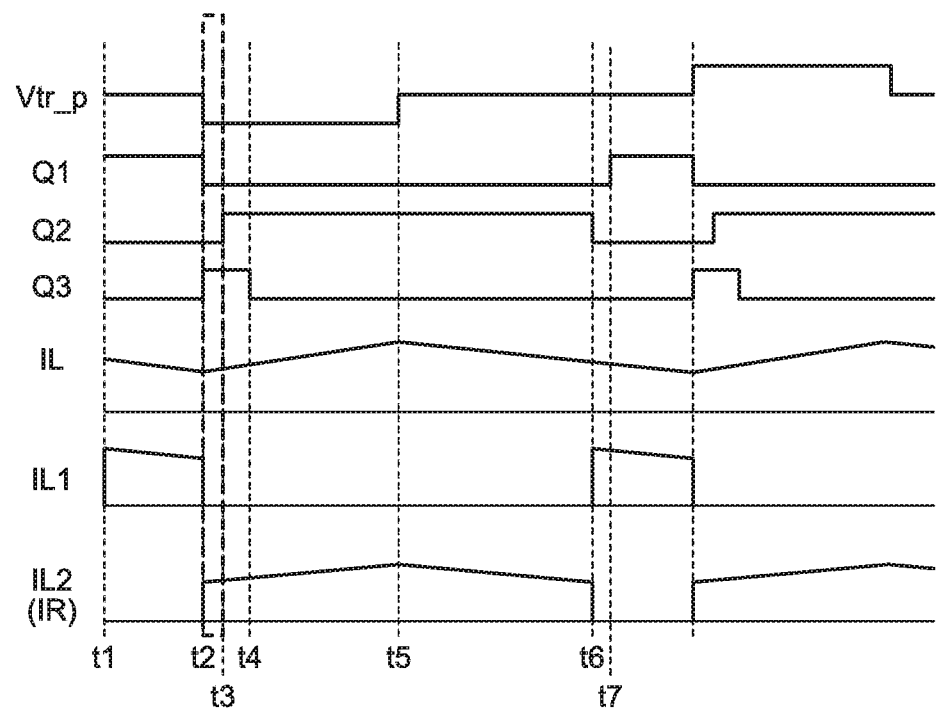
FIG. 5 is a sequence diagram illustrating the second operation example of the multi-output power supply device according to the embodiment.

FIG. 4 is a circuit diagram illustrating a second operation example of the multi-output power supply device 1 according to the embodiment. FIG. 5 is a sequence diagram illustrating the second operation example of the multi-output power supply device 1 according to the embodiment. As illustrated in FIGS. 4 and 5, the controller 80 turns off the FET Q1 and turns on the FET Q3 at time t2 to lower a potential between the source terminal of the FET Q1 and the drain terminal of the FET Q2. Then, the controller 80 outputs the reverse recovery current IR flowing due to the reverse recovery characteristic of the parasitic diode of the FET Q1 to the second output terminal 62. As a result, the potential between the FET Q1 and the FET Q2 starts to change from the first voltage Vo1 to the second voltage Vo2. At this time, the controller 80 does not output the inductor current IL1 from the first output terminal 61 and does not output the inductor current IL2 from the second output terminal 62. The diode D1 causes the inductor current IL2 flowing from the inductor L1 to the inductor L2 to flow back to the inductor L1 by turning on the FET Q3.

Figure 6:
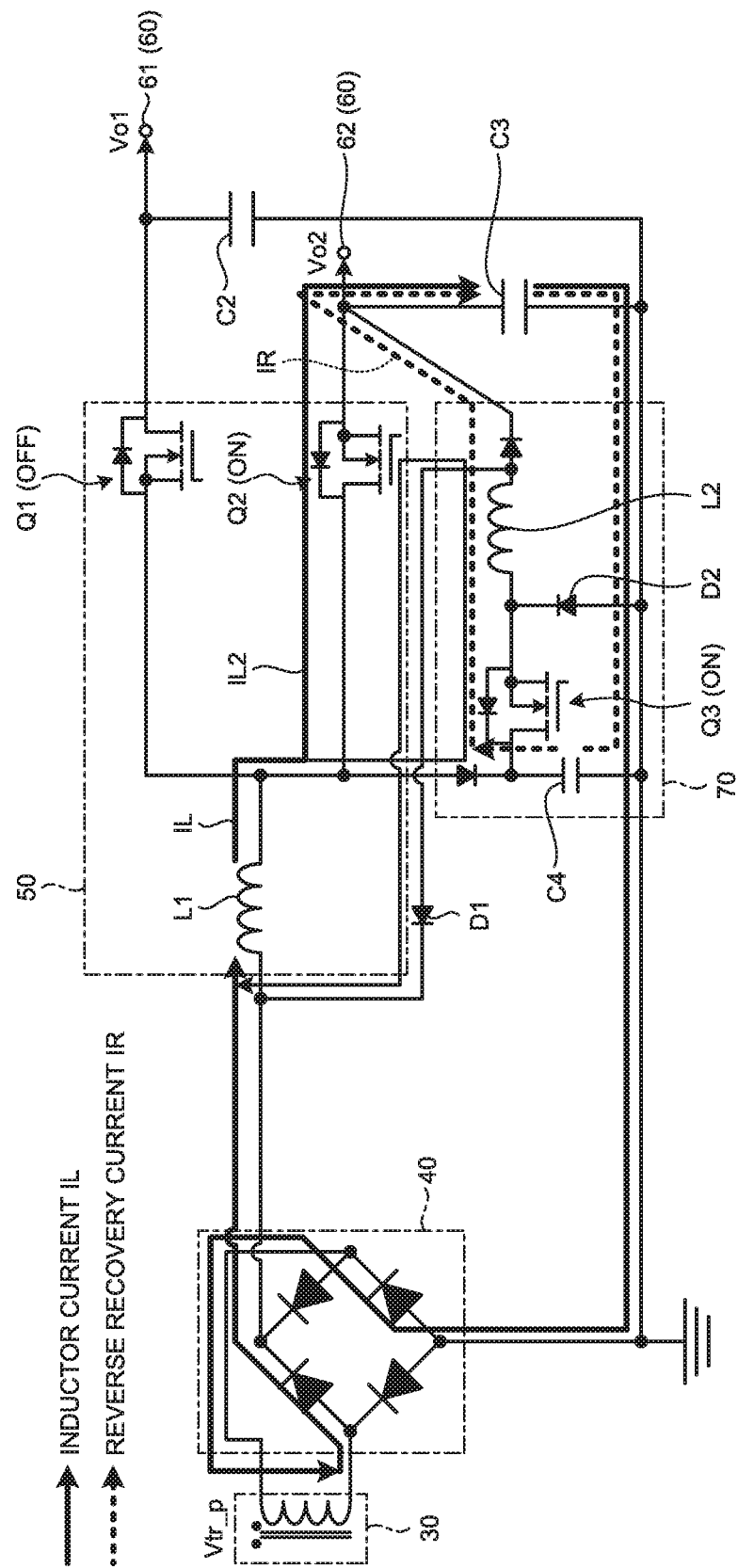
FIG. 6 is a circuit diagram illustrating a third operation example of the multi-output power supply device according to the embodiment.
Figure 7:
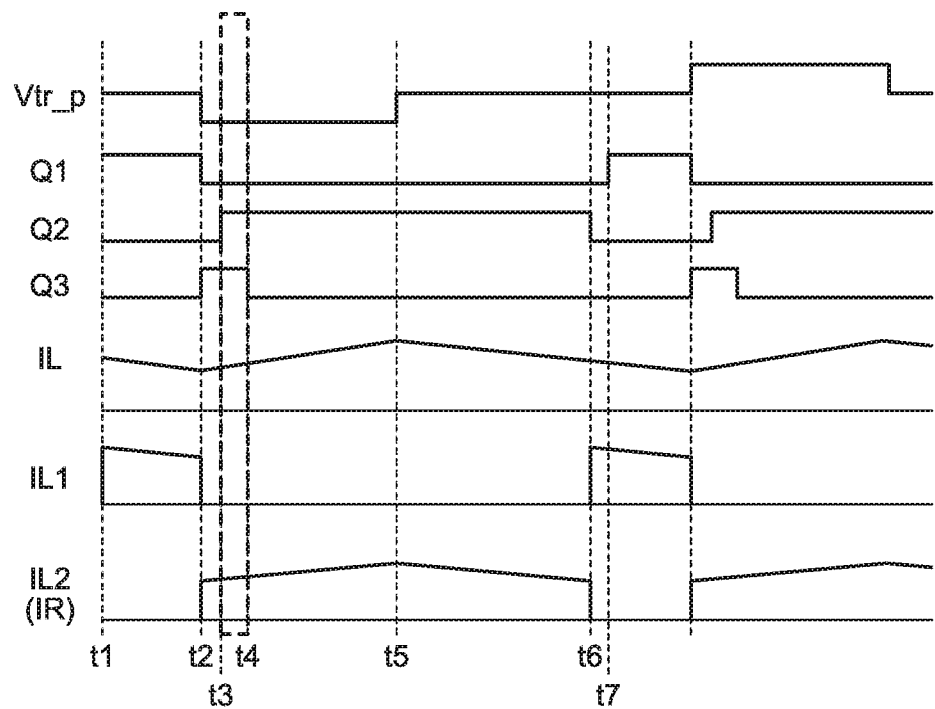
FIG. 7 is a sequence diagram illustrating the third operation example of the multi-output power supply device according to the embodiment.

FIG. 6 is a circuit diagram illustrating a third operation example of the multi-output power supply device 1 according to the embodiment. FIG. 7 is a sequence diagram illustrating the third operation example of the multi-output power supply device 1 according to the embodiment. As illustrated in FIGS. 6 and 7, the controller 80 turns on the FET Q2 at time t3 to output the inductor current IL2 from the second output terminal 62. Here, the time t3 is the timing at which the reverse recovery current IR is ended and the potential between the FET Q1 and the FET Q2 becomes the second voltage Vo2. At this time, a potential difference between the drain terminal and the source terminal of the FET Q2 becomes 0 V, so that soft switching (zero voltage switching (ZVS)) in which noise generated by the reverse recovery current IR is suppressed becomes possible. At this time, the controller 80 does not output the inductor current IL1 from the first output terminal 61.

Figure 8:
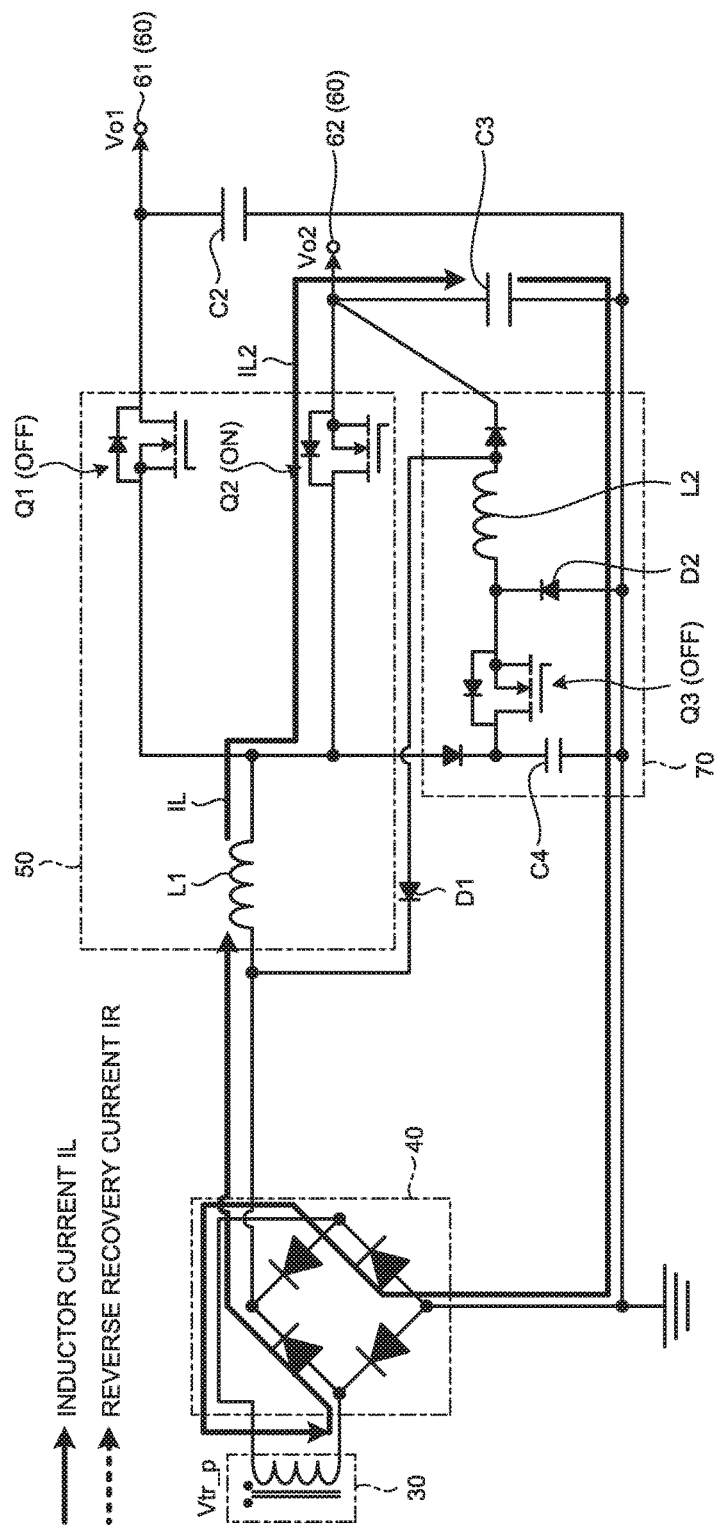
FIG. 8 is a circuit diagram illustrating a fourth operation example of the multi-output power supply device according to the embodiment.
Figure 9:
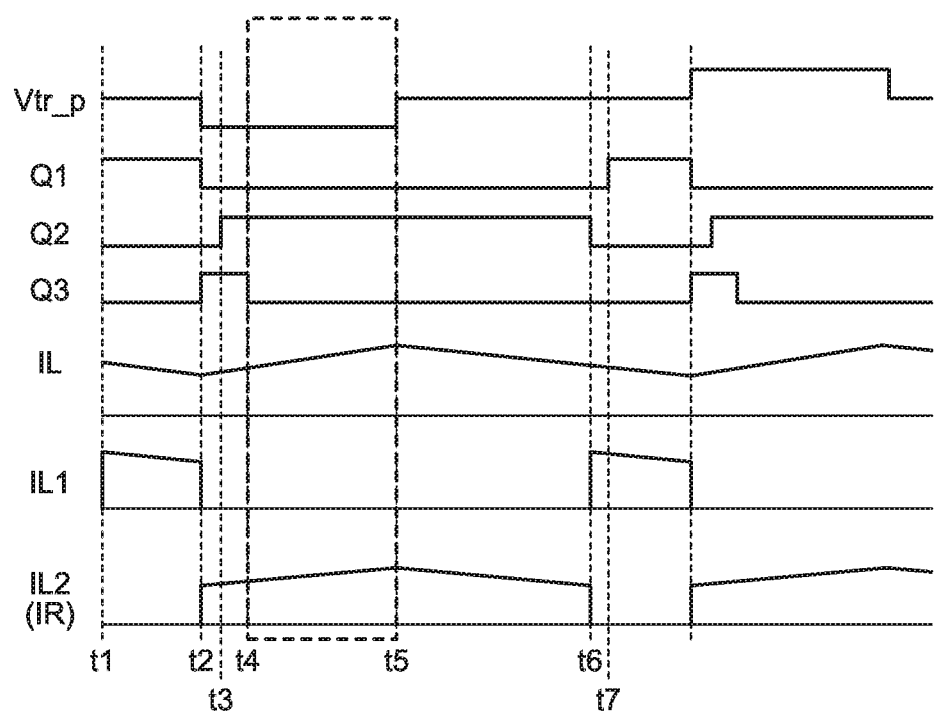
FIG. 9 is a sequence diagram illustrating the fourth operation example of the multi-output power supply device according to the embodiment.

FIG. 8 is a circuit diagram illustrating a fourth operation example of the multi-output power supply device 1 according to the embodiment. FIG. 9 is a sequence diagram illustrating the fourth operation example of the multi-output power supply device 1 according to the embodiment. As illustrated in FIGS. 8 and 9, the controller 80 ends the soft switching operation by turning off the FET Q3 at time t4, and outputs the inductor current IL2 from the second output terminal 62 (a second power output mode). At this time, the controller 80 does not output the inductor current IL1 from the first output terminal 61.

Figure 10:
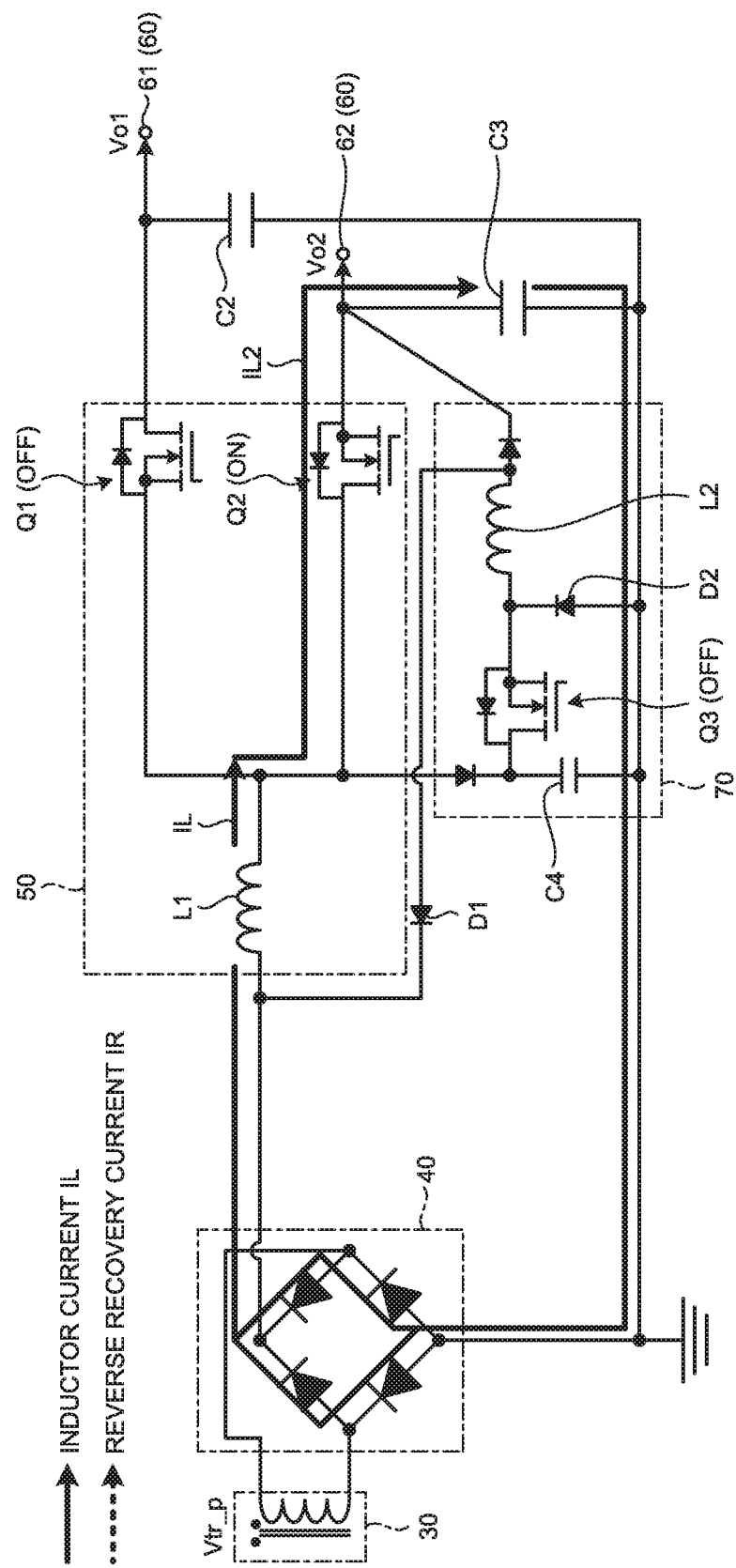
FIG. 10 is a circuit diagram illustrating a fifth operation example of the multi-output power supply device according to the embodiment.
Figure 11:
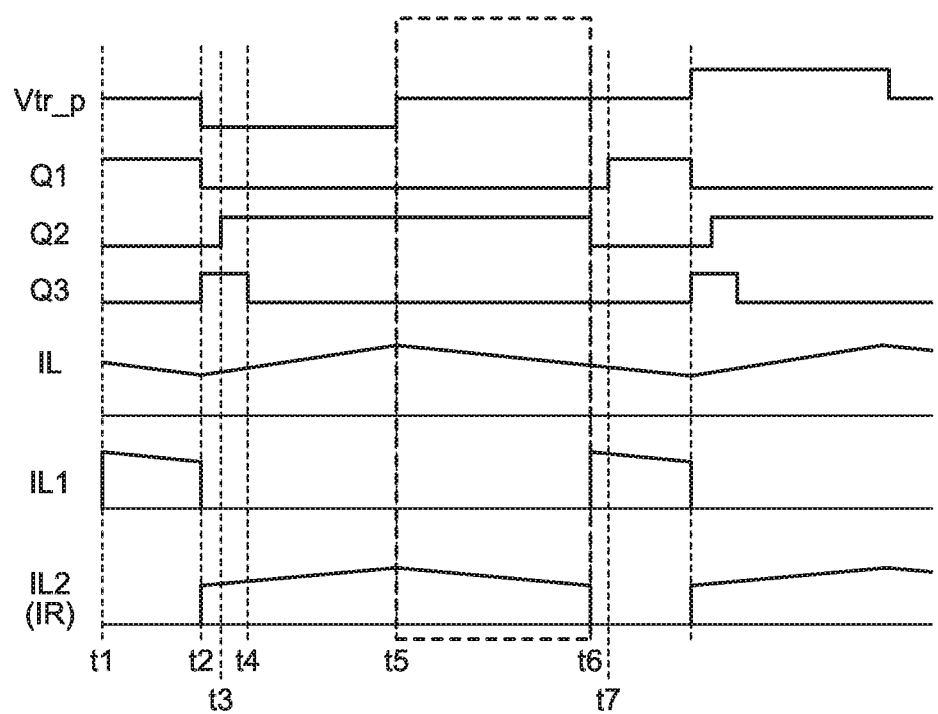
FIG. 11 is a sequence diagram illustrating the fifth operation example of the multi-output power supply device according to the embodiment.

FIG. 10 is a circuit diagram illustrating a fifth operation example of the multi-output power supply device 1 according to the embodiment. FIG. 11 is a sequence diagram illustrating the fifth operation example of the multi-output power supply device 1 according to the embodiment. As illustrated in FIGS. 10 and 11, the controller 80 inverts the voltage Vtr_p of the transformer 30 and outputs the inductor current IL2 from the second output terminal 62 at time t5. At this time, the controller 80 does not output the inductor current IL1 from the first output terminal 61.

Figure 12:
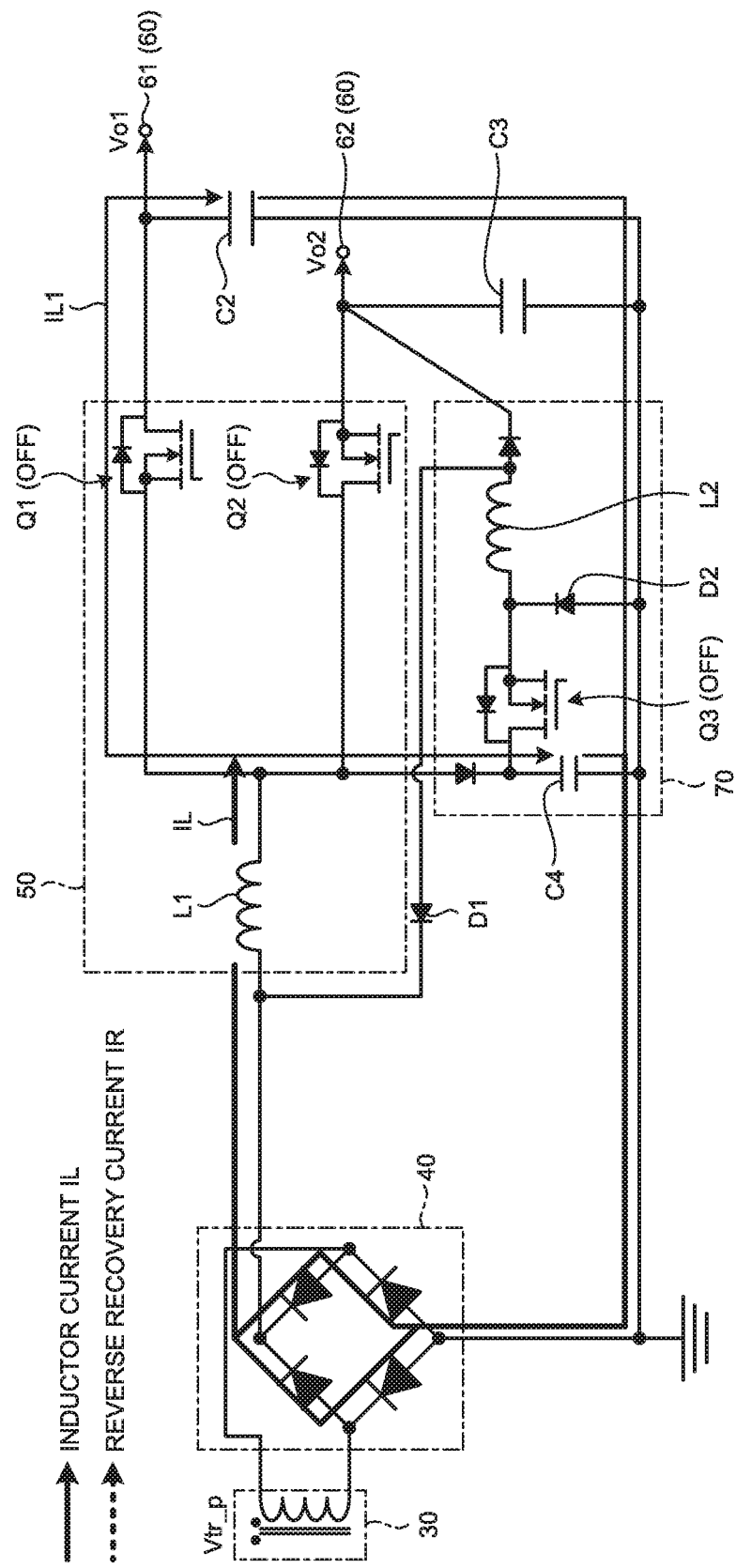
FIG. 12 is a circuit diagram illustrating a sixth operation example of the multi-output power supply device according to the embodiment.
Figure 13:
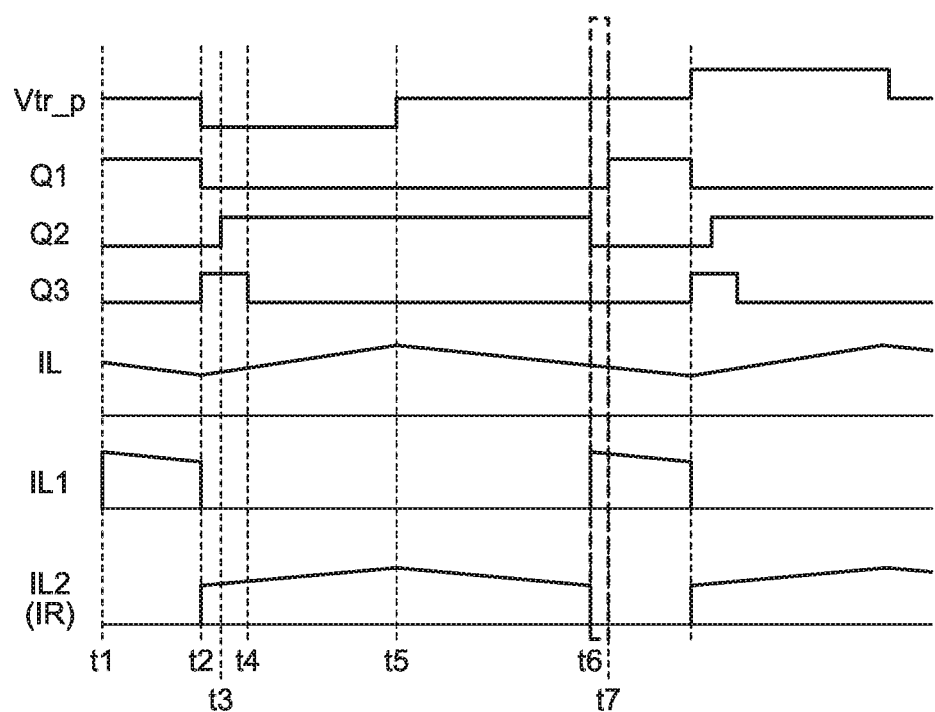
FIG. 13 is a sequence diagram illustrating the sixth operation example of the multi-output power supply device according to the embodiment.

FIG. 12 is a circuit diagram illustrating a sixth operation example of the multi-output power supply device 1 according to the embodiment. FIG. 13 is a sequence diagram illustrating the sixth operation example of the multi-output power supply device 1 according to the embodiment. As illustrated in FIGS. 12 and 13, the controller 80 turns off the FET Q2 at time t6 to output the inductor current IL1 from the first output terminal 61 via the parasitic diode of the FET Q1. At this time, the controller 80 does not output the inductor current IL2 from the second output terminal 62.

Figure 14:
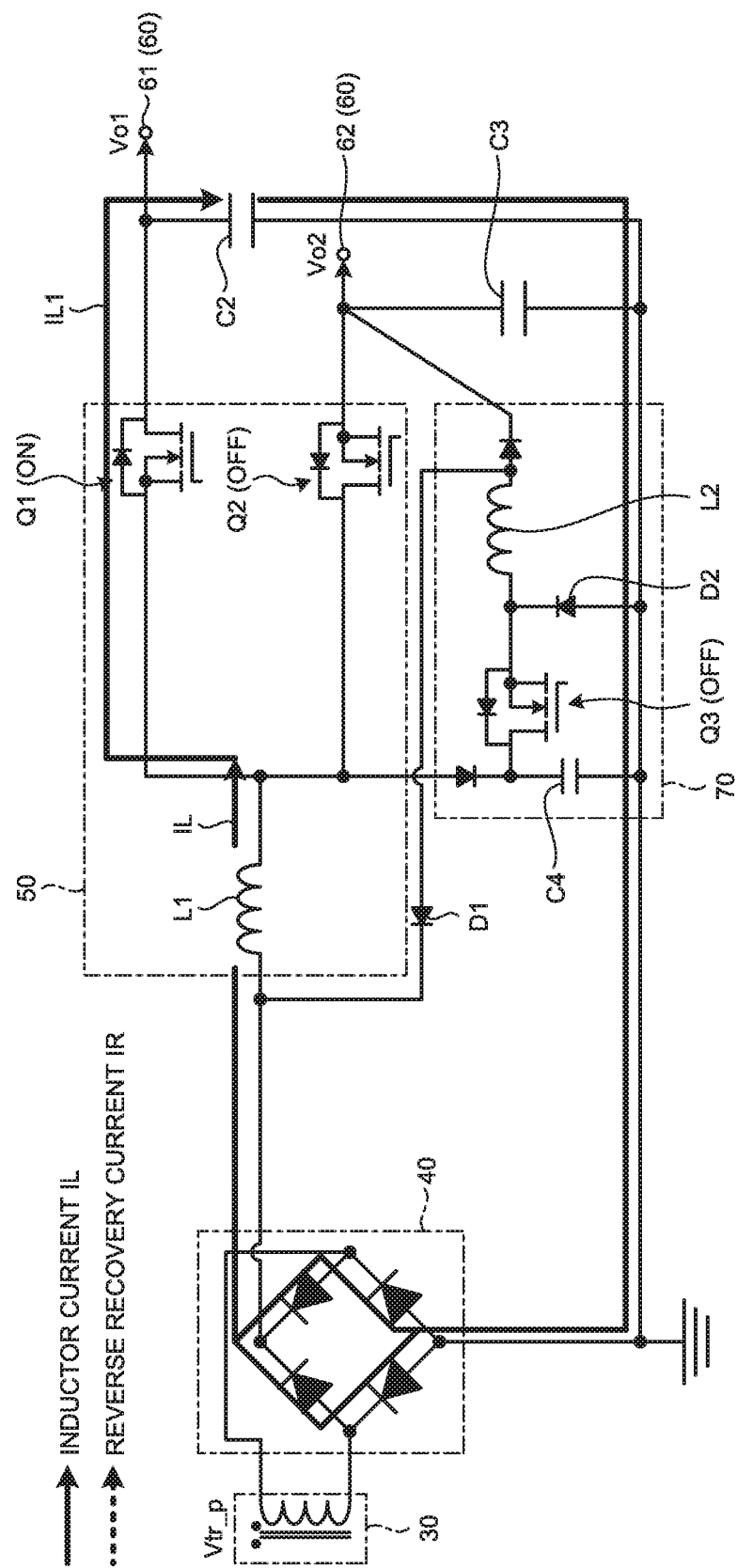
FIG. 14 is a circuit diagram illustrating a seventh operation example of the multi-output power supply device according to the embodiment.
Figure 15:
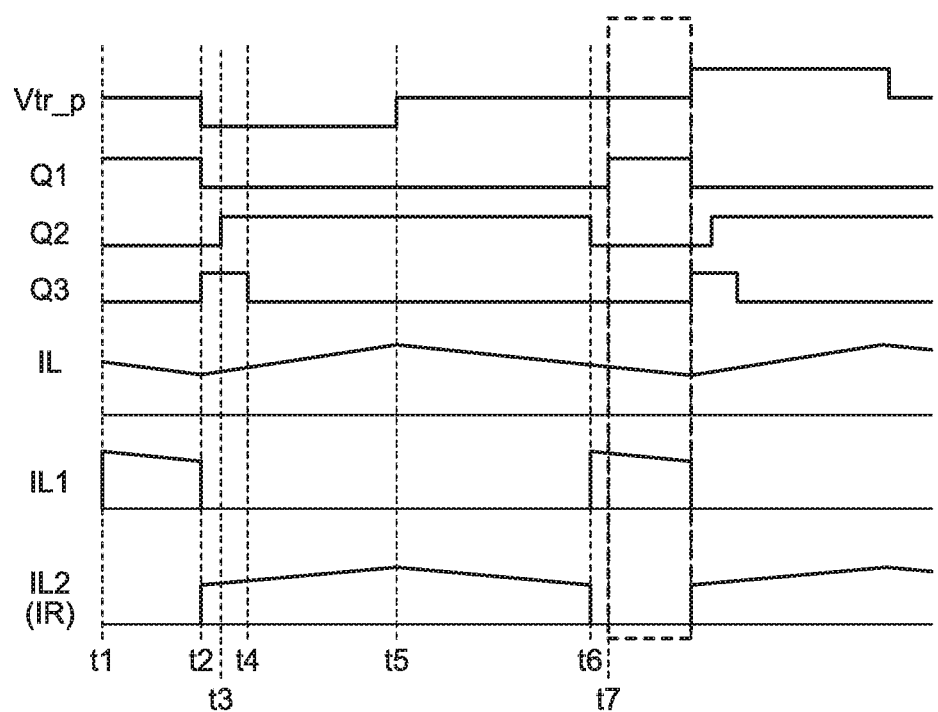
FIG. 15 is a sequence diagram illustrating the seventh operation example of the multi-output power supply device according to the embodiment.

FIG. 14 is a circuit diagram illustrating a seventh operation example of the multi-output power supply device 1 according to the embodiment. FIG. 15 is a sequence diagram illustrating the seventh operation example of the multi-output power supply device 1 according to the embodiment. As illustrated in FIGS. 14 and 15, the controller 80 turns on the FET Q1 at time t7 to output the inductor current IL1 from the first output terminal 61 (the first power output mode). At this time, the controller 80 does not output the inductor current IL2 from the second output terminal 62. In this manner, the multi-output power supply device 1 switches between the first power output mode and the second power output mode.

Next, the power conversion by the multi-output power supply device 1 will be described. The controller 80 performs power conversion between the first output terminal 61 and the second output terminal 62. At this time, the controller 80 stops the full-bridge circuit 20 and the rectifier circuit 40. In the case of outputting power from the first output terminal 61 to the second output terminal 62, the controller 80 controls the chopper circuit 70 to output power from the first output terminal 61 to the inductor L2 by turning on the FET Q3 and turning off the FET Q4, and then, repeats the operation of turning off the FET Q3 and turning on the FET Q4 to step down the first voltage Vo1 of the power that has been output to the inductor L2 to the second voltage Vo2 and output the second voltage Vo2 to the second output terminal 62.

In addition, in the case of outputting power from the second output terminal 62 to the first output terminal 61, the controller 80 controls the chopper circuit 70 to output power from the second output terminal 62 to the inductor L2 by turning on the FET Q4 and turning off the FET Q3, and then, repeats the operation of turning on FET Q3 and turning off FET Q4 to step up the second voltage Vo2 of the power that has been output to the inductor L2 to the first voltage Vo1 and output the first voltage Vo1 to the first output terminal 61.

As described above, the multi-output power supply device 1 according to the embodiment includes the inductor L1, the first output terminal 61, the second output terminal 62, the FET Q1, the FET Q2, the chopper circuit 70, and the controller 80. The inductor L1 outputs power input from one end to the other end. The first output terminal 61 is connected to the other end of the inductor L1, and outputs power. The second output terminal 62 is a terminal different from the first output terminal 61, and is connected to the other end of the inductor L1 and outputs power. The FET Q1 is provided between the other end of the inductor L1 and the first output terminal 61 and adjusts a current output from the inductor L1 to the first output terminal 61. The FET Q2 is provided between the other end of the inductor L1 and the second output terminal 62 and adjusts the current output from the inductor L1 to the second output terminal 62. The chopper circuit 70 has the FET Q3 and the inductor L2. The FET Q3 is connected in parallel with the FET Q2, and conducts or cuts off a current. The inductor L2 is provided between the FET Q3 and the second output terminal 62. The controller 80 controls the FET Q1, the FET Q2, and the chopper circuit 70. For example, the controller 80 lowers a potential from the first output terminal 61 by turning on the FET Q3 and sets a potential difference between the drain terminal (input terminal) and the source terminal (output terminal) of the FET Q2 to zero to suppress a switching loss when the FET Q2 is turned on.

With this configuration, the multi-output power supply device 1 can suppress the noise generated by the reverse recovery current IR flowing due to the reverse recovery characteristic of the parasitic diode of the FET Q1 from affecting the switching operation of the FET Q2. As a result, the multi-output power supply device 1 can suppress the switching loss of the FET Q2, and can suppress heat generation of the FET Q2. The multi-output power supply device 1 does not need to use a complicated heat dissipation structure, a large filter, or the like as in the related art, and thus, it is possible to suppress a size increase of the device and to reduce the weight. In addition, the multi-output power supply device 1 can suppress a current loss by outputting the reverse recovery current IR to the second output terminal 62. As a result, the multi-output power supply device 1 can appropriately supply power of a plurality of different voltages. In addition, the multi-output power supply device 1 can suppress the switching loss of the FET Q2 as described above, and thus, can easily increase a switching frequency, and as a result, the transformer 30 and the inductor L1 can be downsized.

In the above multi-output power supply device 1, the controller 80 has the first power output mode of turning on the FET Q1 and turning off the FET Q2 and the FET Q3 to output first power (the first voltage Vo1) from the first output terminal 61. In addition, the controller 80 has the second power output mode of turning on the FET Q2 and turning off the FET Q1 and the FET Q3 to output second power (the second voltage Vo2) from the second output terminal 62. Further, when switching from the first power output mode to the second power output mode, the controller 80 turns off the FET Q1 and the FET Q2 and turns on the FET Q3 to output the reverse recovery current IR flowing due to the reverse recovery characteristic of the parasitic diode of the FET Q1 to the second output terminal 62. With this configuration, the multi-output power supply device 1 can suppress the noise generated by the reverse recovery current IR from affecting the switching operation of the FET Q2 when switching from the first power output mode to the second power output mode, and can appropriately supply power of a plurality of different voltages.

In the above multi-output power supply device 1, the chopper circuit 70 forms the step-down chopper circuit that steps down a voltage of power output from the first output terminal 61 and outputs the stepped down voltage to the second output terminal 62, and forms the step-up chopper circuit that steps up a voltage of power output from the second output terminal 62 and outputs the stepped up voltage to the first output terminal 61. With this configuration, the multi-output power supply device 1 can share the chopper circuit 70 for the soft switching as both the step-down chopper circuit and the step-up chopper circuit. As a result, the multi-output power supply device 1 can suppress an increase in the number of components, and thus, can suppress the size increase of the device and an increase in manufacturing cost.

Modification

Figure 16:
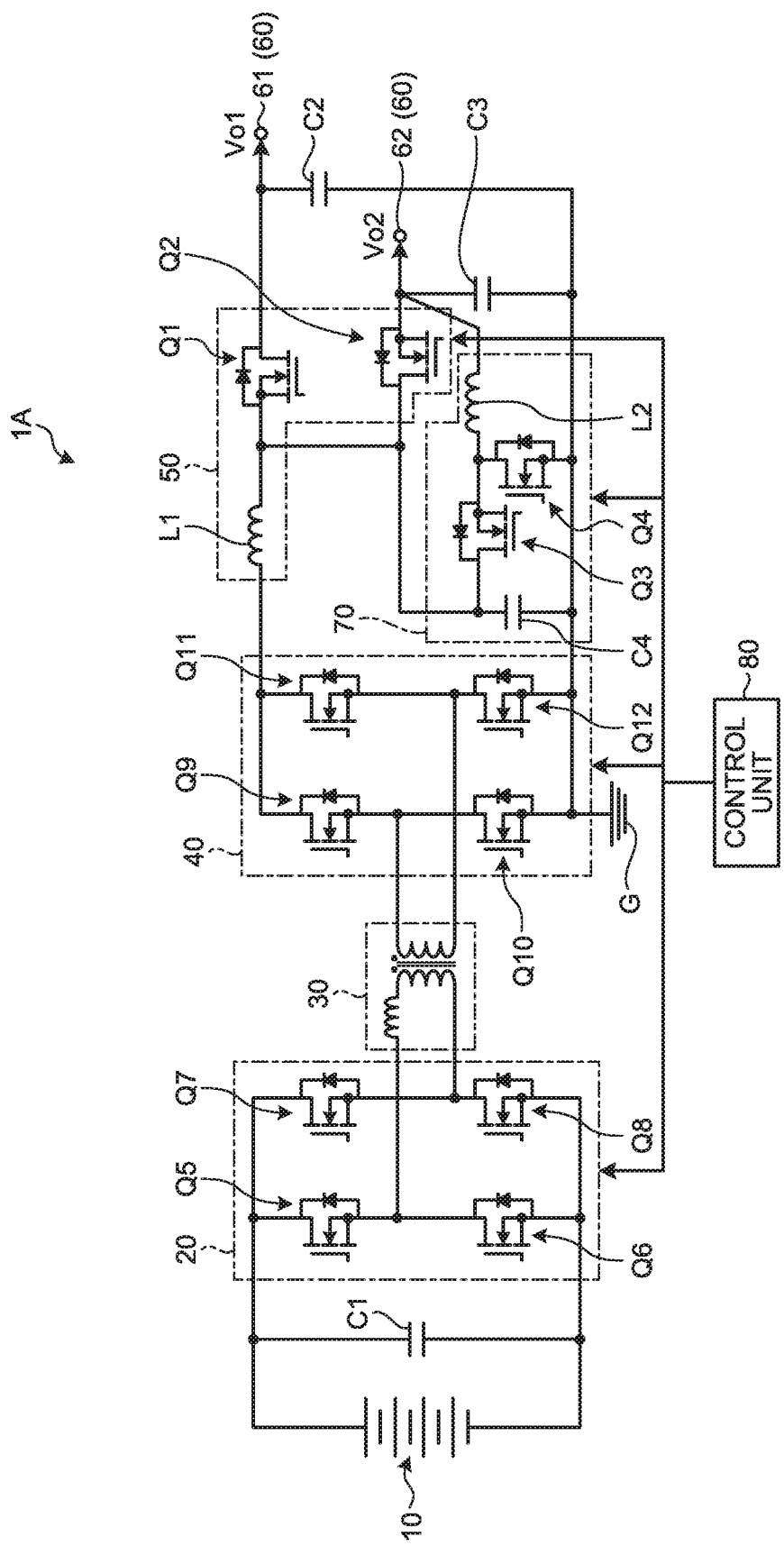
FIG. 16 is a circuit diagram illustrating a configuration example of a multi-output power supply device according to a modification of the embodiment.

Next, a modification of the multi-output power supply device 1 according to the embodiment will be described. FIG. 16 is a circuit diagram illustrating a configuration example of a multi-output power supply device 1A according to the modification of the embodiment. The multi-output power supply device 1A according to the modification is different from the multi-output power supply device 1 according to the embodiment in terms that the diode D1 is not provided. The multi-output power supply device 1A according to the modification is a power supply device for low power. In the case of low power, it is possible to omit the operation of turning on the FET Q3 to cause the current flowing from the inductor L1 to the inductor L2 to flow back to the inductor L1, and thus, the diode D1 can be omitted as illustrated in FIG. 16.

Although the example in which the chopper circuit 70 performs the power conversion has been described in the above description, the power conversion is not necessarily performed.

Although the example in which the FETs Q1 to Q12 are the N-channel MOSFETs has been described, the invention is not limited thereto, and other switching elements such as an insulated gate bipolar transistor (IGBT) may be adopted.

Since a power supply device according to the present embodiment outputs a current, which flows due to a reverse recovery characteristic of a parasitic diode of a first switching element, to a second output terminal, noise caused by the current can be suppressed from affecting a switching operation of the second switching element, and power of a plurality of different voltages can be appropriately supplied.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply device comprising:
   a power conversion inductor that outputs power input from a first end to a second end;
   a first output terminal that is connected to the second end of the power conversion inductor and outputs power;
   a second output terminal that is a terminal different from the first output terminal, is connected to the second end of the power conversion inductor, and outputs power;
   a first switching element that is provided between the second end of the power conversion inductor and the first output terminal and adjusts a current output from the power conversion inductor to the first output terminal;
   a second switching element that is provided between the second end of the power conversion inductor and the second output terminal and adjusts a current output from the power conversion inductor to the second output terminal;
   a soft switching circuit including
      a third switching element that is connected in parallel with the second switching element and conducts or cuts off a current, and
      a soft switching inductor provided between the third switching element and the second output terminal; and
   a controller configured to control the first switching element, the second switching element, and the soft switching circuit, wherein
   the controller lowers a potential from the first output terminal by turning on the third switching element and sets a potential difference between an input terminal and an output terminal of the second switching element to zero to suppress a switching loss when the second switching element is turned on.

2. The power supply device according to claim 1, wherein the controller has
   a first power output mode of turning on the first switching element and turns off the second switching element and the third switching element to output first power from the first output terminal, and
   a second power output mode of turning on the second switching element and turning off the first switching element and the third switching element to output second power from the second output terminal, and
   the controller turns off the first switching element and the second switching element and turns on the third switching element to output a current flowing due to a reverse recovery characteristic of a parasitic diode of the first switching element to the second output terminal when switching from the first power output mode to the second power output mode.

3. The power supply device according to claim 2, wherein the soft switching circuit forms a step-down chopper circuit that steps down a voltage of power output from the first output terminal and outputs the stepped down voltage to the second output terminal, and forms a step-up chopper circuit that steps up a voltage of power output from the second output terminal and outputs the stepped up voltage to the first output terminal.

4. The power supply device according to claim 1, wherein the soft switching circuit forms a step-down chopper circuit that steps down a voltage of power output from the first output terminal and outputs the stepped down voltage to the second output terminal, and forms a step-up chopper circuit that steps up a voltage of power output from the second output terminal and outputs the stepped up voltage to the first output terminal.

* * * * *